May 27, 1952

JOHN P. FRANCESCO
NOW BY JUDICIAL CHANGE OF NAME
JOHN PATSY FRANCIS
PLUG FASTENER
Filed Feb. 2, 1948

2,597,857

*INVENTOR:*
JOHN P. FRANCESCO
BY

ATT'Y.

Patented May 27, 1952

2,597,857

UNITED STATES PATENT OFFICE 2,597,857

PLUG FASTENER

John P. Francesco, Haverhill, Mass., now by judicial change of name John Patsy Francis Application February 2, 1948, Serial No. 5,707

3 Claims. (Cl. 85—3)

(Granted under the act of March 3, 1883, as amended April 30, 1928; 370 O. G. 757)

This invention relates in general to a plug fastener and is more particularly described as a device applicable from one side only through an opening in a plate, a wall, or another article, for sealing leaks, attaching similar or unlike articles together, providing an anchorage for cables, supporting signs from a wall, and for many other uses both temporary and permanent.

An important object of the invention is to provide a fastener which is insertable from the front through a hole in an article or a plurality of articles with means projectable at the back of the articles so they may be gripped from opposite sides, to hold a plug in place, to fasten the articles together, to provide a liquid seal, or to form a secure anchorage by which other articles may be secured in place or used as a means of attachment.

A further object of the invention is to provide improved means for projecting arms from a fastener plug and additionally locking them in place for a heavy load.

Still a further object of the invention is to provide means for applying and handling a plug fastener and to determine when the parts are moved relatively to each other to be in the locking position.

Other objects of the invention will appear in the specification and will be apparent from the accompanying drawings, in which:

Fig. 2 is a side elevation of the plug fastener only, at right angles to the view in Fig. 1;

Figure 1:
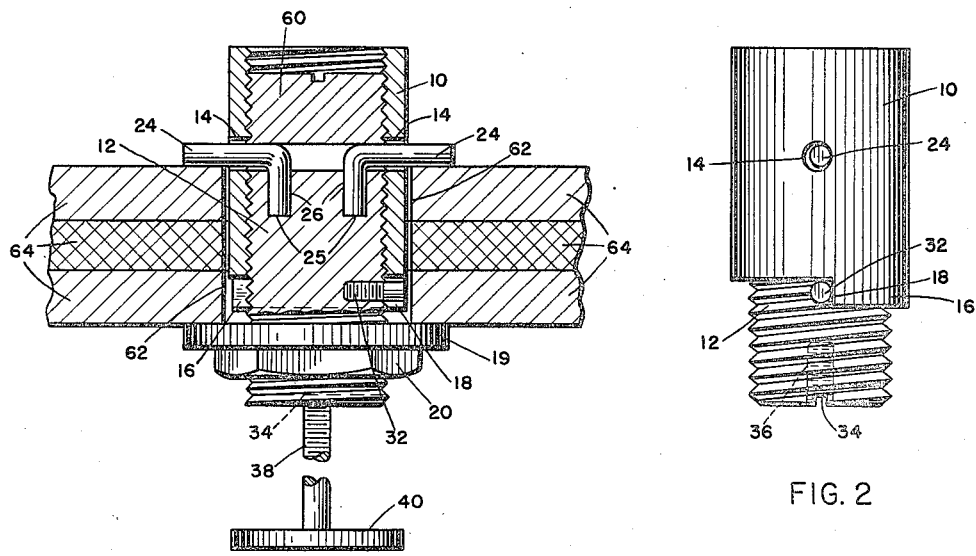
Fig. 1 is a sectional elevation of a plug fastener in accordance with this invention applied to several thicknesses of material.

Rivets and snap fasteners of various kinds are commonly used in attaching sheet materials together and supporting them and other articles by means of projections extended at inaccessible rear ends after inserting the fasteners through openings accessible only from the front, or from one side. While the present invention is of this general type, it utilizes a new and improved construction for extending the locking arms straight outwardly, it provides means for backing and strengthening the arms for heavy duty, and it provides a holder for inserting and applying a plug fastener which prevents loss of the fastener itself and consequent loss of time in making a number of applications or installations.

Referring now more particularly to the drawings, a sleeve 10 is provided with internal threads engaged by corresponding external threads of a plug 12 and making a relatively easy running fit therewith. Intermediate the ends of the sleeve are opposite holes 14, and at one end is an extending rim portion 16 forming a stop 18.

The plug 12 is sufficiently long so that when one end is inserted in the sleeve 10 until it is flush with the edges of the holes 14, the other end will project outwardly beyond the end of the sleeve more than enough to receive a washer 19 and a locknut 20 thereon.

Figure 3:
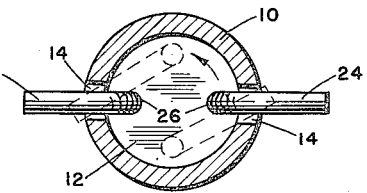
Fig. 3 is a sectional plan view of the fastener showing the engaging arms in projecting position.
Figure 4:
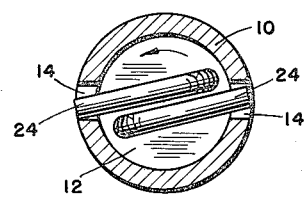
Fig. 4 is a sectional plan view of the fastener showing the engaging arms in retracted position.
Figure 5:
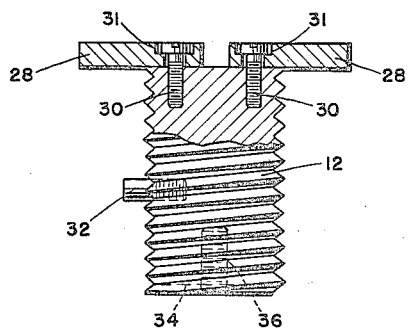
Fig. 5 shows a plug with projectable arms pivoted thereto by screws.

Connected to the plug at its inserted end are engaging arms which may be right-angled bars 24 each having one end 25 inserted in an opening 26 in the end of the plug, or straight bars 28 may be pivotally connected to the end of the plug by cap screws 30, inserted through one end of each bar in a countersunk recess 31. In either case the bars are pivoted at opposite sides of the end of the plug and are of sufficient length to extend into the opposite hole 14 of the sleeve 10 as shown by Fig. 4 when in retracted position and to project through the same hole when the plug and sleeve are relatively rotated as shown in Fig. 3. When there is no stop on the plug 12 it may be rotated in either direction from the projected position in Figure 3 to withdraw the arms, and in slightly less than one half of a rotation the arms will be retracted and in contact with each other to form a stop and substantially parallel with each other as shown in Figure 4. The arms will be reversed if the plug is rotated in the other direction. The arms may also be sufficiently projected in about one half of a rotation of the plug and then retracted by a continued movement of the plug in the same direction for about one half of a rotation.

A projecting stop pin 32 is inserted in the side of the plug 12, preferably by threading it in place, and in line with a transverse screwdriver slot 34 in the end of the plug. The stop pin is located to engage the stop 18 of the rim portion of the sleeve 10 when the engaging arms are projected through the holes 14, and both the position of the stop pin 32 and the slot 34 indicate to an operator how the arms are disposed.

In the projecting end of the plug 12 is a threaded opening 36 to receive a correspondingly threaded rod 38 having a crosspiece handle 40. This handle rod is used to apply the fastener to an opening and to remove or extract it from an opening. The fastener is liable to be dropped through an opening in applying it, particularly when inverted or applied in a downward direction. By attaching the rod until the washer 19 and locknut 20 are applied to the plug 12, all the parts may be adjusted and tightened, and then the rod is removed.

Figure 6:
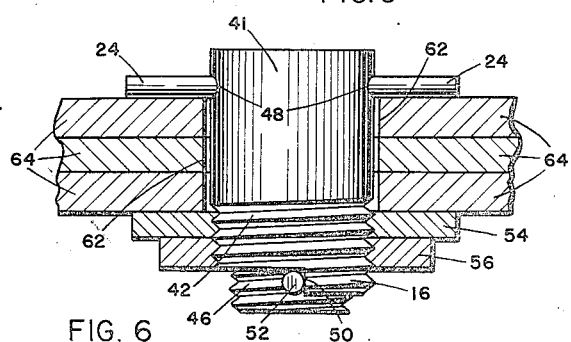
Fig. 6 shows a fastener in which the draw-up nut is threaded directly on the end of the sleeve.

For some installations the fastener may comprise a sleeve 41 as shown in Fig. 6, in which exterior threads 42 are provided at one end in addition to the interior threads which engage exterior threads on an inserted plug 46. This sleeve has holes 48 near one end through which the engaging arms extend, with a shoulder 50 at the other end engaged by a stop pin 52 projecting near the outer end of the plug 46. In this form one or more washers 54 are loosely applied over the end of the sleeve and a locknut 56 is tightened on the end threads 42.

In assembling the arms in these fasteners, the plug 12 is inserted until one end is nearly flush with the edges of the opposite holes 14 in the sleeve, the bars 24 of the engaging arms are inserted from the inside into the opposite holes 14 with the plug 12 in the position shown in Fig. 4, the ends 25 of the bars being inserted into the swiveling openings 26 in the plug. To keep the arms in place and to strengthen them for heavy loads a plug screw 60 is inserted from the end of the sleeve opposite the plug 12 and is adjusted on the inner threads of the sleeve until it is just above the bars 24 and will contact them when the plug 12 is rotated relative to the sleeve to project the engaging arms outwardly. When the fastener is thus secured in place, the arms will be supported from both sides which will hold them firmly. In disengaging the plug fastener, the plug 12 is backed outwardly from the inner contact surface of the plug screw 60 so that the arms are immediately loosened and are easily withdrawn within the sleeve.

In attaching this plug fastener through a hole 62 in a plate 64, or through a plurality of such plates, as shown in Fig. 1, the engaging arms are drawn within the periphery of the sleeve, the sleeve is inserted through the holes 62 from one side of the plates 64, until the engaging arms are clear at the inner sides of the plates. The plug is then rotated in the sleeve projecting the arms and the sleeve is pulled outwardly engaging the arms with the back plate. If the plug (or the sleeve in Fig. 6) is sufficiently long to manually engage or hold the outer end, the washer 19, or washers, may be applied and tightened against the outer plate by a locknut 20. If these plug fasteners are small, or too heavy, and are liable to drop through the holes 62, the threaded holding rod 38 may be inserted into the plug until the arms are extened, the washer and fastening nut applied to the accessible end of the plug (or the sleeve), and then the holding rod removed.

A clearance space between the end of the sleeve 19 and the washer 19 is allowed for compression and to prevent the washer from engaging the sleeve. For sealing leaks, rubber washers or gaskets may be used, and the threads coated with a hardening or setting material as a means for sealing the fasteners. This clearance space may be packed with lead, paste, pitch, cement, or other materials depending upon the type of liquid or fluid to be sealed, or other packing material, like oakum, felt, and the like may be inserted between the sleeve and the washer.

To withdraw and remove the plug fastener, the applying procedure is reversed; the holding rod 38 may be attached first, the locknut loosened, and the plug rotated in the sleeve to retract the projected arms into the sleeve. The entire fastener is then withdrawn and may be re-used as desired.

When a large number of these fasteners are to be used in a project where the approximate length is known, the outside threaded sleeve type as shown in Fig. 6, may be more economical and more easily applied.

The forms as described should be regarded as an illustration or example of the invention and not as a restriction or limitation thereof.

The invention described herein may be manufactured and used by or for the Government of the United States of America for governmental purposes without the payment of any royalties thereon or therefor.

I claim:

1. A fastening device for holding two or more layers of material firmly together comprising a hollow sleeve internally threaded and having opposed holes passing through the walls thereof, a first externally threaded plug member within said sleeve in threaded engagement with the internal threads of said sleeve, the inner face of said first plug member uncovering said holes in said sleeve, a pair of opposed holes in the inner face of said plug member, the outer end of said first plug member extending beyond the end of said sleeve and including externally threaded portions thereon, right angled arms respectively pivotally supported in said opposed holes of said plug member, said arms dimensioned to be retractable within the outer periphery of said sleeve when said plug is rotated into a first position, and to be extendable through said opposed holes when said plug member is rotated into a second position to engage one of the surfaces to be fastened, a second externally threaded plug member located in said sleeve opposite said first plug member and in threaded engagement with the internal threads of said sleeve, the inner face of said second plug member abutting against the said arms on the side opposite said first plug member when said arms are extending from the holes of said sleeve, a nut in threaded engagement with the threads on the end of said first plug member extending beyond said sleeve and adapted to tightly abut one of the surfaces to be fastened which is opposite said latter surface engaged by said arms whereby the fastening device is securely held in place.

2. The combination of claim 1 characterized further by a stop shoulder on said sleeve, a projection on said first plug member adapted to abut against said stop shoulder to prevent rotation of said first plug member into said sleeve when same is rotated into the position where said arms fully extend through the said opposite holes of said sleeve.

3. A fastening device for holding two or more layers of material firmly together comprising a hollow sleeve internally threaded and having opposite holes therethrough, an externally threaded plug member in said sleeve in threaded engagement with the internal threads of said sleeve, the outer end of said plug member extending beyond one end of said sleeve and including externally threaded portions thereon, the inner face of said plug member uncovering said opposed holes in said sleeve, a pair of opposed holes in the inner face of said plug member, arms having bent portions respectively pivotally mounted in said opposed holes in said plug member and projectable through the said opposed holes in said sleeves when said plug member is rotated in the sleeve substantially flush with the edges of the latter holes, said arms retractable within said sleeve upon rotation of said plug member from said flush position with said sleeve holes, an axially-overhanging shoulder portion on the end of said sleeve containing said plug member, a stop pin projecting outward from the plug member and adapted to engage said overhanging shoulder to prevent further inward rotation of said plug member when said arms are fully projecting from said sleeve, a nut in threaded engagement with said threads on the outer end of said plug member extending beyond said sleeve adapted to abut one of the surfaces to be fastened whereby the fastening device is securely held in place.

JOHN P. FRANCESCO.

REFERENCES CITED

The following references are of record in the file of this patent:

UNITED STATES PATENTS

| Number | Name | Date |
|---|---|---|
| 742,562 | Becraft | Oct. 27, 1903 |
| 1,169,635 | Grimes | Jan. 25, 1916 |
| 1,895,251 | Karl | Jan. 24, 1933 |
| 1,968,959 | Randall et al. | Aug. 7, 1934 |
| 2,061,638 | Segal | Nov. 24, 1936 |
| 2,426,134 | Wilson | Aug. 19, 1947 |

FOREIGN PATENTS

| Number | Country | Date |
|---|---|---|
| 122,777 | Switzerland | Sept. 1, 1927 |
| 485,087 | Great Britain | May 13, 1938 |